Nov. 29, 1966     R. C. McCALL     3,288,997
THERMOLUMINESCENT DOSIMETER ELEMENT READOUT APPARATUS
Filed Aug. 29, 1963
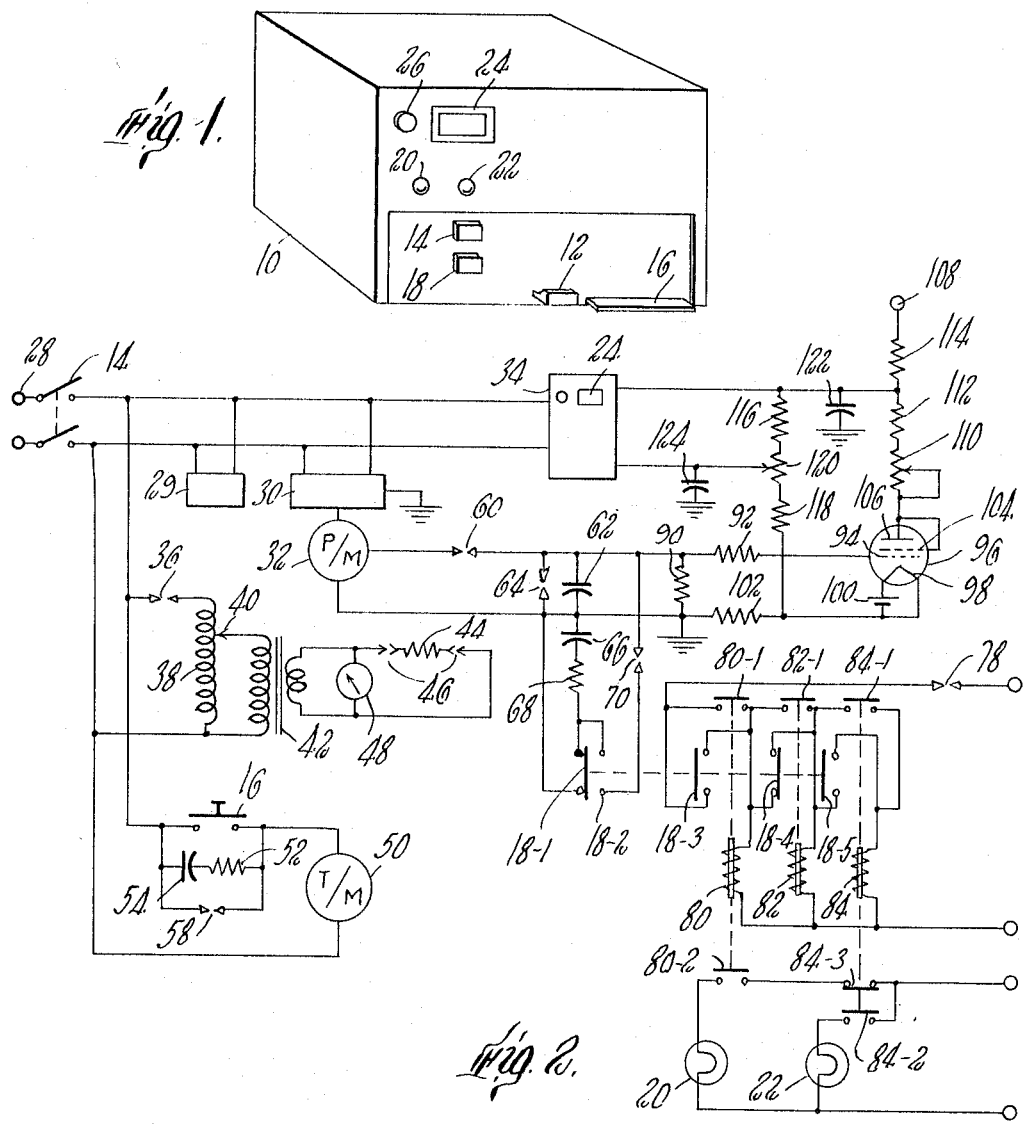
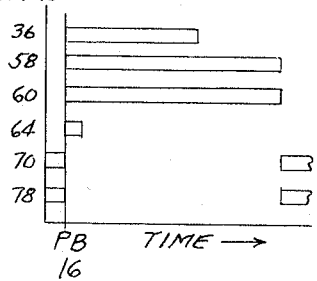

United States Patent Office 3,288,997
Patented Nov. 29, 1966

3,288,997
THERMOLUMINESCENT DOSIMETER ELEMENT READOUT APPARATUS
Richard C. McCall, Watertown, Mass., assignor to Controls for Radiation, Inc., Cambridge, Mass., a corporation of Massachusetts
Filed Aug. 29, 1963, Ser. No. 305,292
6 Claims. (Cl. 250—71.5)

This invention relates to measurement apparatus and more particularly to electrical quantity measuring apparatus especially useful in apparatus for measuring radiation dosage and radiation dose measuring equipment incorporating such apparatus.

Radiation dosimetry may be performed employing crystalline thermoluminescent material which, when exposed to significant radiation, stores energy which may be controllably released in the form of light energy by subsequently heating the material. This light energy, when appropriately released and measured, provides a direct indication of the radiation dosage to which the material has been exposed. In order to provide valid information, the light output must be sensed with precision, and in typical radiation measurement applications it is desired to measure radiation dosage over several orders of magnitude. Conventional electrical signal measuring apparatus employed in such devices incorporate a photomultiplier tube for sensing the light output and converting it into an electrical signal, and a transducer for providing an indication of the magnitude of the electrical signal. Typically, the electrical signal is stored in an integrating operation, and an electrometer circuit measures the stored signal. However, resort to complex, multicomponent electrometer circuitry is conventionally necessary to extend the linear range of the electrometer circuit to the desired orders of magnitude of radiation dosage.

It is an object of this invention to provide novel and improved radiation dosimetry apparatus having a range of several orders in magnitude and which employs simplified and relatively inexpensive electrical circuitry.

Another object of the invention is to provide novel and improved electrometer circuitry which enables the useful range of the electrometer circuit to be extended by orders of magnitude.

Still another object of the invention is to provide novel and improved electrical apparatus for measuring electrical signal quantities.

Other objects, features and advantages of the invention will be seen as the following description of a preferred embodiment of the invention progresses, in conjunction with the drawing, in which:

FIG. 1 is a perspective view of radiation dosimeter measuring equipment incorporating the apparatus of the invention;

FIG. 2 is a schematic diagram of the electrical quantity measuring circuitry employed in the radiation dosimetry equipment shown in FIG. 1; and FIG. 3 is a timing diagram indicating the cycle of operation of timing contacts incorporated in the dosimetry equipment of FIGS. 1 and 2.

With reference to FIG. 1, the dosimeter reading apparatus is housed in a case 10. A slide 12 disposed in front of the case receives a planchet carrying thermoluminescent material for insertion into the appartus for heating and light readout. Also disposed on the front wall of the case 10 are a start switch 14 to apply power to the system, readout cycle start switch 16, a multiplication factor switch 18 and indicator lamps 20, 22 which indicate a multiple of the digital voltmeter that is displayed at window 24. Also mounted on the case adjacent window 24 is a zero adjust control 26 for the digital voltmeter.

The circuitry as housed within this unit is shown in schematic form in FIG. 2. Power is supplied over lines 28 through switch 14 to operate a blower 29 that is housed within the case 10, a high voltage power supply 30 for a photomultiplier tube 32 and a digital voltmeter unit 34. The A.C. power is also supplied through timer contacts 36 to an autotransformer 38 that has an adjustable tap 40 and then through a step down transformer 42 to apply current to planchet 44 which may be connected in circuit through contacts 46. A meter 48 is connected across the secondary of transformer 42 to provide an indication of the current flow through the planchet 44. Additional details of the planchet structure and relation to the photomultiplier tube are disclosed in the copending patent application, Serial No. 259,266, entitled "Radiation Sensor Reading Apparatus," filed February 18, 1963.

Timing of the dosimeter readout cycle is controlled by timing motor 50 which is connected to the power supply through switch 16. Connected across switch 16 is a capacitor 54 and resistor 52 in parallel with timing contacts 58 which maintain a circuit after the push button 16 initially completes the circuit.

The output current produced by the photomultiplier 32 is applied through timer contacts 60 to an integrating capacitor 62. Timer contacts 64 in parallel with the capacitor 62 provide a discharge path for capacitor 62 at the beginning of each readout cycle. A multiplication circuit is connected to capacitor 62 and includes a second capacitor 66, the capacitance value of which is a precise multiple of the capacitance value of capacitor 62 and in the preferred embodiment is nine times as large. Capacitor 66 is connected through a resistance 68 through a pair of normally closed switch contacts 18–1 so that capacitor 66 is normally shorted and thus maintained in completely discharge condition. A second set of normally open contacts 18–2 are closed when contacts 18–2 are opened, and complete a circuit to place capacitor 66 in parallel with capacitor 62 (providing timer contacts 70 are closed).

Each paralleling operation of the capacitors is displayed by lamps 20, 22 as controlled by relay logic operated by push button 18. That logic is energized from a D.C. source through timer contacts 78 and includes three relays 80, 82, 84. The energization of these relays is controlled by contacts 18–3, 18–4 and 18–5 of the multiplier push button 18. Relay 80 has two sets or normally open contacts 80–1 and 80–2; relay 82 has a single set or normally open contacts 82–1; while relay 84 has two sets of normally open contacts 84–1, 84–2 and a set of normally closed contacts 84–3. The relay logic is supplied by a D.C. source which in the preferred embodiment is obtained from a full wave rectifier of the A.C. supply, and the lamps 20 and 22 are supplied by a 6.3 volt A.C. source, also obtained from the A.C. supply.

The charge on the capacitor 62 is measured by an electrometer tube circuit which includes a resistor 90 of high value ($10^{10}$ ohms) connected to a grid resistor 92 to the grid 94 of the electrometer tube 96. The cathode 98 of that tube is supplied by a biasing voltage of 1.3 volts by battery 100 and is connected to ground through resistor 102. The screen grid 104 of the electrometer tube is connected to the anode 106 and an anode is connected to a D.C. source at terminal 108 through a D.C. offset voltage compensation circuit including an adjustable resistor 110 and two fixed resistors 112, 114. The output signal is applied to the digital voltmeter 34 through a network including fixed resistors 116 and 118 and adjustable resistor 120 provide an adjustment to control the fraction of the signal output from the electrometer tube 96 that is applied to the voltmeter 34. Capacitors 122 and 124 provide a bypass to ground for A.C. signal components so that a D.C. signal only is applied to the digital voltmeter 34. The signal applied thereto is converted to a digital value for display on indicator 24.

The timing motor 50 has a cycle of operation as indicated in FIG. 3. (Timer contacts have been shown in order to simplify the drawing, but it is preferred to employ high impedance relays, particularly in circuit with capacitors 62 and 66, to perform the indicated control functions in response to the timer 50.) At the beginning of each cycle only contacts 70 and 78 are closed. Upon the depression of push button 16 the timing motor 50 is started and contacts 70 and 78 open while 36, 58, 60 and 64 close. The opening of contact 70 disables the multiplying circuit while the opening of contact 78 resets relays 80, 82 and 84. The closing of contact 36 supplies power to the planchet heating circuit to heat the thermoluminescent powder disposed on planchet 44; contact 58 completes a holding circuit for timer 50; contact 60 connects the photomultiplier 32 to the integrating circuit; while contact 64 discharges capacitor 62. After a short time (typically less than two seconds) contact 64 opens. This occurs before the thermoluminescent material has been heated sufficiently to release significant light. After ten seconds contact 36 opens to interrupt the planchet heating circuit; and at the end of fifteen seconds contacts 58 and 60 open (stopping timer 50 and disconnecting photomultiplier 32 from capacitor 62) and contacts 70 and 78 close (enabling the multiplier circuitry).

The light produced by the heated thermoluminescent material is sensed by the photomultiplier 32 and it produces a current which is applied through timer contacts 60 to charge capacitor 62. The charge on capacitor 62 is sensed by the high input impedance electrometer circuit so that the accumulated charge is not adversely affected and an indication is displayed by the digital voltmeter 34. Should the readout value be off scale at the end of the timer cycle (above a predetermined value which exceeds the linearity characteristics of the electrometer circuit) the push button 18 is depressed, connecting capacitor 66 in parallel with integrating capacitor 62 to reduce the charge on capacitor 62 by a factor of ten.

This operation, in addition to paralleling capacitors 66 and 62 through contacts 18–2, also closes contacts 18–3 to complete an energizing path for relay 80. When that relay is energized, a holding circuit is completed through contacts 80–1 to maintain that relay energized and contacts 80–2 also close to light the indicator lamp 20 indicating an X10 multiplication factor should be applied to the displayed reading at window 24. Upon release of the push button, contacts 18–4 close completing an energizing circuit for relay 82, and contacts 82–1 close to provide a holding circuit for relay 82 and supply power to the lower terminal of switch contact 18–5. Should the voltmeter readout indication still be in excess of the linearity characteristics of the electrometer circuit, the operation can be repeated by again depressing switch 18 which in this case again reduces the charge by another factor of ten (or a total of one hundred (X100)) and at the same time closes contacts 18–5 energizing relay 84. With that relay energized, contacts 84–1 close to complete a holding circuit, contacts 84–2 close to energize X100 indicator 22, and contacts 84–3 open to de-energize X10 indicator 20. Additional multiplication indicator stages may be similarly provided if desired. Also other indicating circuitry may be employed.

Thus a relatively simple electrometer circuit can be employed in a precise thermoluminescent radiation dosage readout circuit which is capable of operation in an easy and straightforward manner so that the electrometer is operated well within its linearity characteristics to provide accurate radiation dosage readings over any suitable five decade range such as a one MR—one hundred R. range.

Thus it will be seen that the invention provides a simple and accurate thermoluminescent dosimeter readout circuit. While a preferred embodiment of the invention has been shown and described, various modifications and other applications thereof will be obvious to those skilled in the art and therefore it is not intended that the invention be limited to the disclosed embodiment or to details thereof and departures may be made therefrom within the spirit and scope of the invention as defined in the claims.

What is claimed is:
1. Radiation dosimetry readout apparatus comprising a light sensor,
   means to dispose thermoluminescent material that has been exposed to radiation in optically coupled relation to said light sensor,
   means to heat said thermoluminescent material to release light as a function of the radiation to which said material has been exposed,
   a first capacitor,
   means to charge said first capacitor as a function of the output of said light sensor,
   potential indicating apparatus including a high impedance electronic circuit connected to said first capacitor,
   a readout indicator to indicate the detected radiation dosage as a function of the charge on said first capacitor,
   a second capacitor having a capacitance value of a known multiple of the capacitance value of said first capacitor, the capacitance value of said second capacitor being larger than the capacitance value of said first capacitor,
   means to completely discharge said second capacitor,
   means to connect said completely discharged second capacitor in parallel with said first capacitor to reduce the charge on said first capacitor by transfer of a portion of that charge to said second capacitance as a function of the ratio of the capacitance value of the two capacitors,
   and means to provide an indication of the multiplication factor of the integrated readout quantity as a function of the number of times said second capacitor is paralleled with said first capacitor.

2. Radiation dosimeter readout apparatus as claimed in claim 1 and further including timing means to provide a first timing cycle for readout of said thermoluminescent material and a second cycle at the end of said first cycle for providing an indication of the charge on said first capacitor,
   said first capacitor being disconnected from said light sensor during said second cycle.

3. Radiation dosimetry readout apparatus comprising a timer,
   transducer means,
   means to dispose thermoluminescent material that has been exposed to radiation in optically coupled relation to said transducer means,
   means responsive to said timer to apply heat to said thermoluminescent material to release light as a function of the radiation to which said material has been exposed,
   means responsive to said timer to connect said transducer means in circuit to provide an electrical signal as a function of the light output of said thermoluminescent material during the heating thereof,
   electrical signal responsive means,
   means connecting said electrical signal responsive means to said transducer to provide an output representative of the radiation dosage to which said thermoluminescent material has been exposed, an output device responsive to said electrical signal responsive means for providing an indication of the radiation dose to which said thermoluminescent material has been exposed,
   and means responsive to said timer for connecting said output device to said electrical signal responsive means after disconnection in response to said timer of said transducer means from said electrical signal responsive means.

4. Radiation dosimetry readout apparatus comprising a timer,
- a photomultiplier tube,
- means to dispose thermoluminescent material that has been exposed to radiation in optically coupled relation to said photomultiplier tube,
- means responsive to said timer to apply heat to said thermoluminescent material to release light as a function of the radiation to which said material has been exposed,
- a capacitor,
- means responsive to said timer to connect said photomultiplier tube to said capacitor to charge said capacitor as a function of the output of said photomultiplier tube during the heating of said thermoluminescent material,
- potential indicating apparatus including a high impedance electrometer tube circuit,
- means responsive to said timer to connect said electrometer tube circuit to said capacitor after said photomultiplier tube is disconnected from said capacitor,
- and indicator means connected to said electrometer tube circuit to indicate the detected radiation dosage as a function of the charge on said capacitor.

5. Radiation dosimetry readout apparatus comprising a timer,
- transducer means including a first capacitor,
- means to dispose thermoluminescent material that has been exposed to radiation in optically coupled relation to said transducer means,
- means responsive to said timer to apply heat to said thermoluminescent material to release light as a function of the radiation to which said material has been exposed,
- means responsive to said timer to connect said transducer means in circuit to provide an electrical signal as a function of the light output of said thermoluminescent material during the heating thereof,
- electrical signal responsive means,
- means connecting said electrical signal responsive means to said transducer to provide an output representative of the radiation dosage to which said thermoluminescent material has been exposed,
- a second capacitor having a capacitance value of a known multiple of the capacitance value of said first capacitor, the capacitance value of said second capacitor being larger than the capacitance value of said first capacitor,
- means responsive to said timer to completely discharge said second capacitor,
- means to connect said completely discharged second capacitor in parallel with said first capacitor to reduce the charge on said first capacitor by transfer of a portion of that charge to said second capacitance as a function of the ratio of the capacitance value of the two capacitors,
- and means to provide an indication of the multiplication factor of the integrated readout quantity as a function of the number of times said second capacitor is paralleled with said first capacitor.

6. Radiation dosimetry readout apparatus comprising a timer,
- a photomultiplier tube,
- means to dispose thermoluminescent material that has been exposed to radiation in optically coupled relation to said photomultiplier tube,
- means responsive to said timer to apply heat to said thermoluminescent material to release light as a function of the radiation to which said material has been exposed,
- a first capacitor,
- means responsive to said timer to connect said photomultiplier tube to said first capacitor, to charge said first capacitor as a function of the output of said photomultipler tube during the heating of said thermoluminescent material,
- potential indicating apparatus including a high impedance electrometer tube circuit,
- means responsive to said timer to connect said electrometer tube circuit to said first capacitor after said photomultiplier tube is disconnected from said first capacitor,
- a digital voltmeter connected to said electrometer tube circuit to indicate the detected radiation dosage as a function of the charge on said first capacitor,
- a second capacitor having a capacitance value of a known multiple of the capacitance value of said first capacitor, the capacitance value of said second capacitor being larger than the capacitance value of said first capacitor,
- means responsive to said timer to completely discharge said second capacitor,
- manually operable means to connect said completely discharged second capacitor in parallel with said first capacitor to reduce the charge on said first capacitor by transfer of a portion of that charge to said second capacitance as a function of the ratio of the capacitance value of the two capacitors,
- and means responsive to said manually operable means to provide an indication of the multiplication factor of the integrated readout quantity as a function of the number of times said second capacitor is paralleled with said first capacitor.

References Cited by the Examiner
UNITED STATES PATENTS

| | | | |
|---|---|---|---|
| 2,573,245 | 10/1951 | Boyd et al. | 250—71 |
| 2,999,206 | 9/1961 | Stoddart et al. | 320—1 X |
| 3,093,734 | 6/1963 | Just | 250—71.5 |
| 3,154,686 | 10/1964 | Zagorites et al. | 250—83.6 X |
| 3,176,133 | 3/1965 | McCall et al. | 250—71.5 |

RALPH G. NILSON, *Primary Examiner.*

ARCHIE R. BORCHELT, *Examiner.*